Dec. 15, 1936.　　　W. J. PASINSKI　　　2,064,562
CASH MACHINE
Filed Sept. 15, 1933　　　6 Sheets-Sheet 1

INVENTOR
Walter J. Pasinski
BY
Rector, Hibben, Davis + Macauley
ATTORNEYS

Dec. 15, 1936. W. J. PASINSKI 2,064,562
CASH MACHINE
Filed Sept. 15, 1933 6 Sheets-Sheet 3

INVENTOR
Walter J. Pasinski
BY
Rector, Hibben, Davis & Macauley
ATTORNEYS

Dec. 15, 1936.  W. J. PASINSKI  2,064,562
CASH MACHINE
Filed Sept. 15, 1933  6 Sheets-Sheet 4

INVENTOR
Walter J. Pasinski
BY
Rector, Hibben, Davis & Macauley
ATTORNEYS

Dec. 15, 1936.   W. J. PASINSKI   2,064,562
CASH MACHINE
Filed Sept. 15, 1933   6 Sheets-Sheet 5

INVENTOR
Walter J. Pasinski
BY
Rector, Hibben, Davis + Macauley
ATTORNEYS

Dec. 15, 1936.   W. J. PASINSKI   2,064,562
CASH MACHINE
Filed Sept. 15, 1933   6 Sheets-Sheet 6

INVENTOR
Walter J. Pasinski
BY
Rector, Hibben, Davis + Macauley
ATTORNEYS

Patented Dec. 15, 1936

2,064,562

UNITED STATES PATENT OFFICE 2,064,562

CASH MACHINE

Walter J. Pasinski, Howell, Mich., assignor to Burroughs Adding Machine Company, Detroit, Mich., a corporation of Michigan Application September 15, 1933, Serial No. 689,662

2 Claims. (Cl. 235—22)

This invention relates to cash registers and is more particularly concerned with the control of certain elements of the cash register mechanism from certain parts of the casing.

Cash registers are generally assembled and supported upon cast skeleton frames which are then enclosed in more or less irregular and unitary box-like casings provided with one or more doors to permit access to one or more controls or counters. In such a structure it is necessary to remove the entire casing should it become desirable or necessary to inspect, adjust or repair any particular part of the cash register mechanism. Removal of the entire casing may necessitate removing certain parts not desired to be disturbed. Furthermore such casings cannot be used universally in connection with cash registers with and without visual indicating tabs. An entirely different casing must be constructed and employed to enclose each type of register.

It is a general object of this invention to provide an improved cash register construction.

It is also an object of this invention to provide an improved cash register casing or housing, together with the necessary and suitable controls in connection with one or more parts thereof.

Further objects and advantages will be apparent from the following description in connection with the drawings in which.

Cash register mechanism

Figure 1:
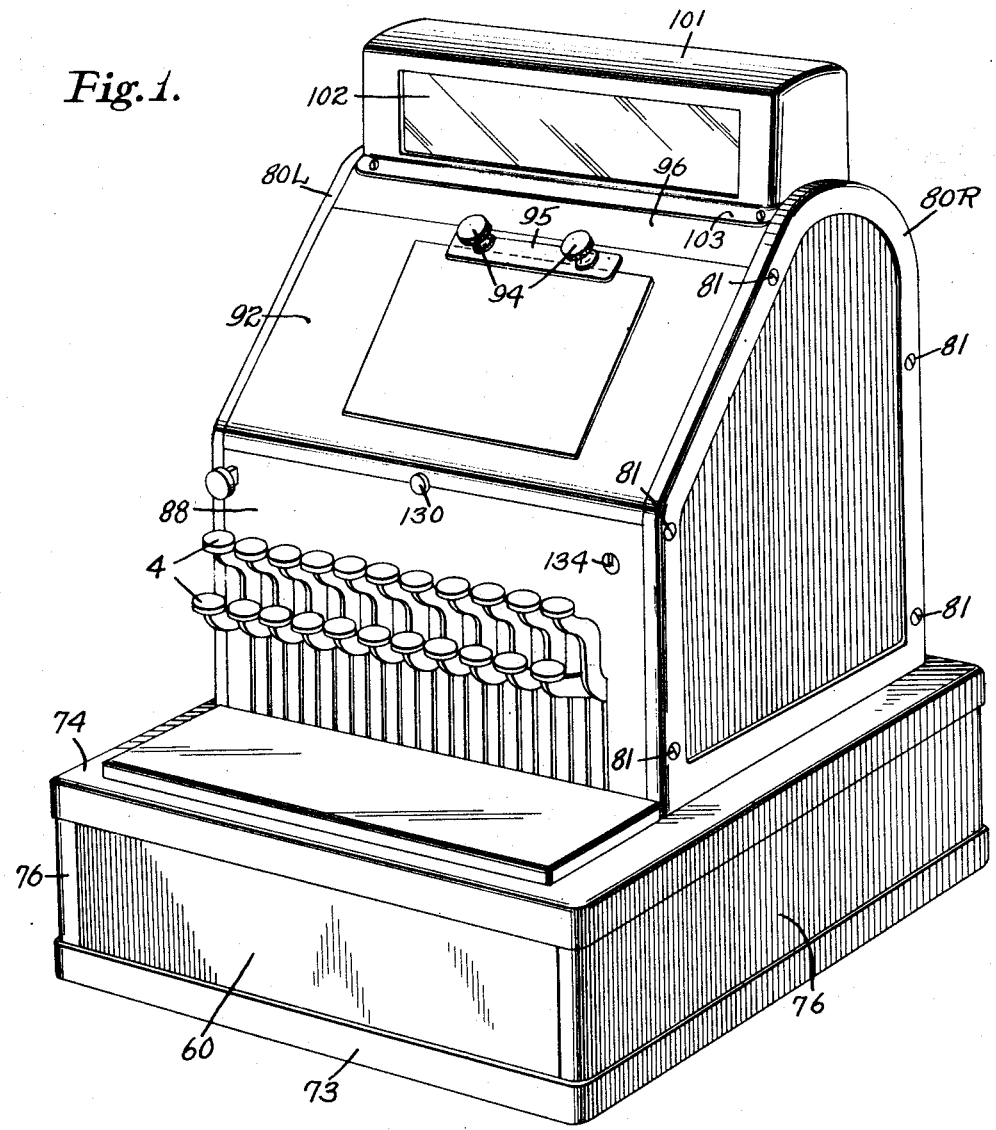
Figure 1 is a perspective view of a complete cash register and casing embodying the features of this invention.

The cash register mechanisms will not be claimed in this application, being the subject matter of my copending application, Serial No. 689,656 filed September 15, 1933, but will be briefly described in order to better comprehend this invention. For a full disclosure of the cash register mechanism reference is made to my copending application.

The cash register mechanism instead of being mounted within a cast frame-like structure is mounted and carried between right and left sheet metal side plates 1 and 2 respectively which support the entire mechanism and are maintained in spaced relation by tubular members 3 and by various shafts constituting parts of the cash register mechanism. This construction not only facilitates assembly, inspection and repair of the machine, but reduces weight and also cost of production, particularly on a quantity basis.

The cash register mechanism includes two rows of depressible keys 4 of the necessary denominations which are journaled on a cross shaft 6 secured to the end plates 1 and 2. The keys are of sufficient length to project forwardly out of the casing later to be described and terminate in the usual finger pieces. The keys are urged clockwise about their shafts by compression springs 7, the movement of the keys being limited by a cross bar 8. Each key has a rearwardly and upwardly extending arm 9 which engages a hollow cross shaft 11 carried at each end by one arm of each of a pair of full stroke levers 12 journaled upon shaft 6 adjacent the side plates 1 and 2. Rocking movement of the levers 12 and shaft 11 is restricted by means of arcuate slots 13 formed in the side plates and through which the ends of shaft 11 project. Levers 12 are constantly urged clockwise by springs 14 attached to the ends of the lower arms 15 of full stroke levers 12. The upper ends of levers 12 terminate in full stroke sectors 16 engageable by pawls 17 to insure a full stroke being made each time levers 12 are oscillated.

It follows from the foregoing that depression of any of the keys 4 causes its rearwardly upstanding arm 9 to urge shaft 11 forwardly and thus rock levers 12 counterclockwise against the action of springs 14. After a full down stroke has been taken as compelled by the full stroke racks and pawls, the depressed keys are restored by springs 7 and levers 12 are restored by springs 14.

Key coupler

A key coupler 18 extends across substantially the entire machine being journaled upon shaft 11 and is provided with a rearwardly and downwardly extending lip 19 adapted to engage lugs 21 extending upwardly from each of the key levers. The coupler is urged clockwise by a pair of springs 22 so as to normally urge lip 19 into path of movement of lugs 21. It (19) must be free to pass over lugs 21 of undepresed keys.

Figure 3:
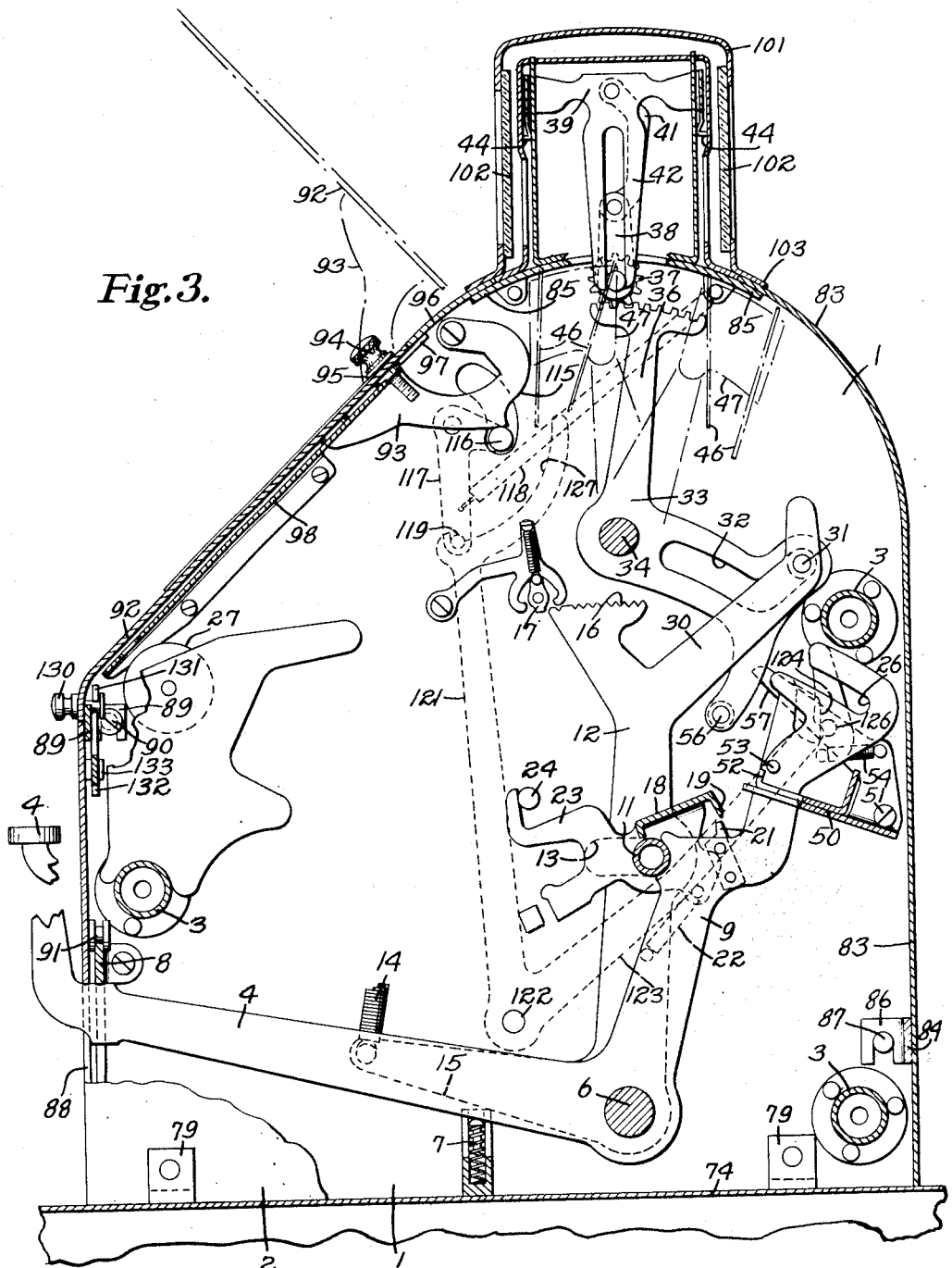
Fig. 3 is a right side sectional elevation of the machine and casing taken just inside of the right register side plate and illustrating particularly the principal register elements and the detachable indicator housing and indicator mechanism.

The key coupler, however, is held disengaged from the key lugs 21 as shown in Fig. 3, by forwardly extending arms 23 on each end of the key coupler which, when the machine is in normal position, engage studs 24, fixed to and extending inwardly from the end plates 1 and 2.

Upon forward movement of the shaft 11, caused by full depression of a key, the forwardly extending arm 23 moves away from the stud 24 and the key coupler is permitted to rotate clockwise by action of springs 22. This causes the coupler to drop behind lugs 21 of all depressed keys and remain in this position during the entire downward and return stroke of the key. At the end of the return stroke arm 23 reengages stud 24 to rock the key coupler counterclockwise about shaft 11 to disengage lugs 21. Key coupler 18 thus insures that all depressed keys will be given a complete downward stroke before a return stroke is permitted since the coupler attaches all depressed key levers to the full stroke lever 12. The coupler furthermore makes it necessary to depress only one key of a group of partially depressed keys the full downward stroke in order to carry all depressed keys down the full stroke. In other words, it permits presetting of several keys for further description of the key coupler and associated mechanisms reference is made to my copending application Serial No. 689,657, filed September 15, 1933, which is directed to this subject matter.

The upper end of each key lever terminates in a cam slot 26. The different slots are of different inclinations and/or depths and constitute the means for actuating the registers 27 as described and claimed in my copending application, Serial No. 689,659, filed September 15, 1933, as well as indexing the visual tabs or characters as will now be explained.

Detachable visible indicator mechanism

Each of the levers 12 is provided with a rearwardly and upwardly extending arm 30 carrying a stud 31 engageable in a cam slot 32 formed in each of two cranks 33, pivoted upon a shaft 34 extending across the machine. Cam slots 32 are so shaped that the cranks 33 are moved at the initial portions of depression of a key 4 and are thereafter not moved until at the end of the return movement of the key.

The upper arms of cranks 33 are provided with toothed sectors 36 meshing with pinions 37 disposed at each side of the machine and pivoted upon studs secured to the side frames. To each gear 37 is secured an arm 38 which is connected to an indicator bail 39 by a link 41 whereby reversed rotation of gears 37 will reciprocate bail 39. Bail 39 extends across the width of the machine and is guided for vertical reciprocatory movement by means of a forked slide 42. Each arm of the bail 39 is provided with a plurality of laterally extending lugs or hooks 44 for selectively engaging indicator tabs 46 contained in tab magazines 47, there being pairs of magazines, one magazine of each pair being for the front and one for the rear of the machine so that the indicator tabs may be read from the front or rear of the machine.

It follows from the foregoing that upon the initial depression of keys 4 bail 39 is lowered and during the remaining portion of the downward stroke of the key, or when the roller 31 is in the dwell of the cam slot 32, the key levers index the registers. During the first part of the return stroke the key levers index the tab magazines and at the end of the return stroke the bail 39 is again raised to normal position and in being raised carries the proper tabs therewith to represent the amount indexed by the depresed keys.

Omission of indicator mechanism

Figure 4:
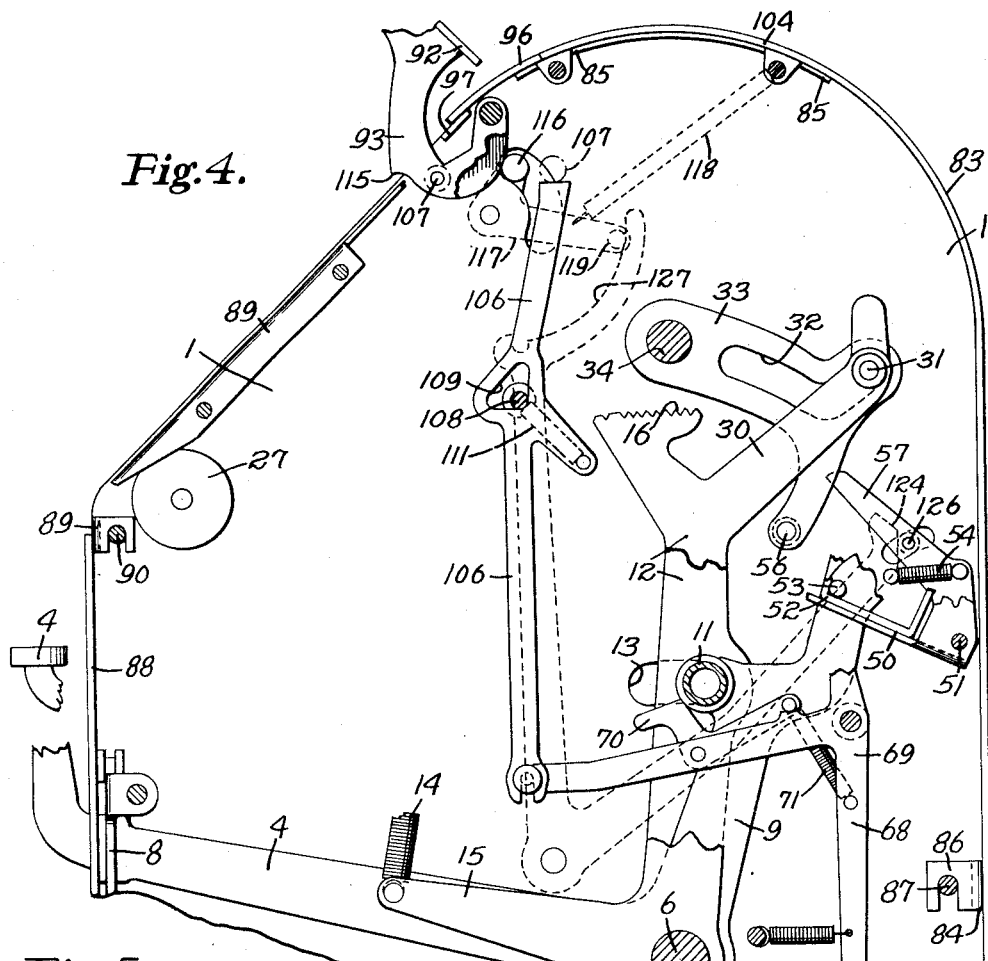
Fig. 4 is a right side elevation with the right side plate, certain of the register mechanisms, and the indicator housing and mechanism removed.
Figure 5:
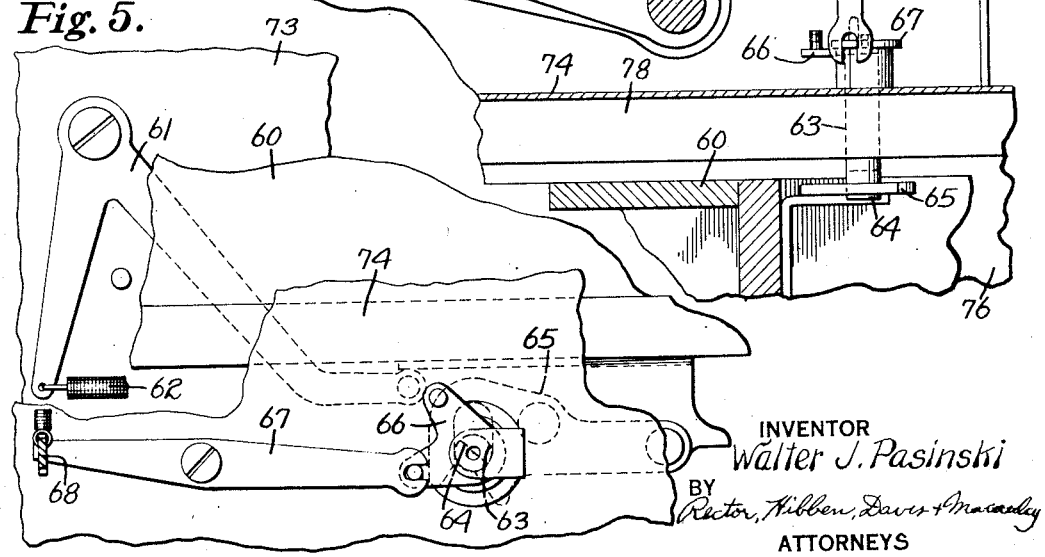
Fig. 5 is a plan detail of the cash drawer latching mechanism.
Figure 6:
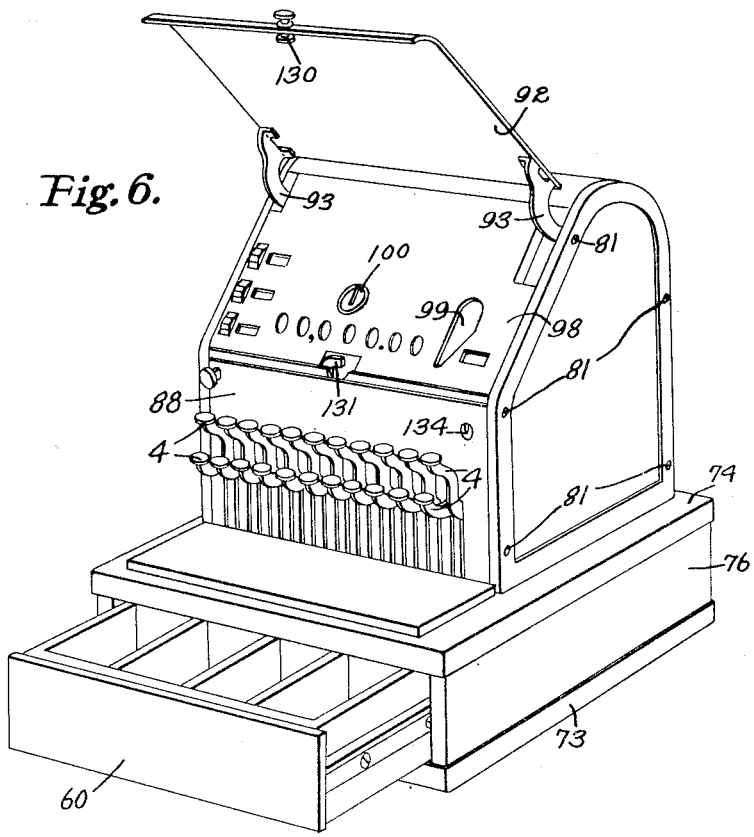
Fig. 6 is a perspective view of the cash register with the indicating mechanism removed and the lid open.

In some uses it may be unnecessary to have a visual indicator or tab mechanism. The present construction provides for such a change with a minimum alteration of the machine and casing. Such a machine is shown in Figs. 4 and 6. From these figures it will be observed that to provide a machine without tabs it is merely necessary to omit the indicating mechanism by detaching tab bail 39, with its forked slide 42, link 41, arm 38, gears 37, the sector arms 36, the tabs and tab magazines. The lower arm of crank 33 which contains the cam slot 32 must be retained inasmuch as this arm performs other functions as will be described.

The indicating mechanism is not shown in detail in this application nor is it claimed herein, but is made the subject matter of my copending application, Serial No. 689,658, filed September 15, 1933, to which reference is made for a full disclosure thereof.

Keylock

It is necessary to provide some means for preventing depression of other keys during completion of the downward stroke of one key. During the early part of movement of the key in being depressed key coupler 18 (Fig. 3) moves behind lug 21 of all depressed keys. As the key depression continues it carries all depressed keys downwardly with the one being depressed. At this time all undepressed keys should be blocked.

For this purpose a cross bail 50 (Fig. 3) is provided, the bail being pivoted at 51 to each side frame of the machine. The bail is provided with an upstanding lug 52 for each key lever, each lug being engageable with a pin 53 extending laterally from each lever. The bail 50 is normally held in disengaged position by a spring 54 which tends to rotate the bail counterclockwise about its pivot 51.

During the initial depression of a key, however, cranks 33 are moved counterclockwise, causing studs 56 carried by a lower projecting finger thereof to engage forwardly extending fingers 57 carried by bail 50, thereby rocking the latter clockwise and thus causing its lugs 52 to engage pins 53 of all undepressed keys to prevent depression of any keys which have not already been depressed. At the extreme end of the return stroke of the key, studs 56 are moved out of contact with fingers 57 and permit bail 50 to resume normal position. Bail 50 is shown in key blocking position in Fig. 4, but this position is caused by another machine operation to be later described.

Cash drawer

The cash register mechanism is designed to be disposed above and control the operation of a cash drawer 60 (Fig. 4) which is normally urged to open position by a crank lever 61 having one arm contacting the rear end of the drawer and being urged toward open position by a spring 62 attached to the other arm. The drawer is normally secured in a closed position by a vertical latching shaft 63 having a half round end 64 engaging an adjustable keeper or strike 65. An arm 66 is attached to the shaft and is connected to one end of a pivoted lever 67 to rotate rocking shaft 63 to either permit it to pass out of the slotted keeper or be retained therein.

Lever 67 is actuated by the lower vertical arm 68 of a three-arm lever 69 pivoted at its center to one side plate. Arm 68 has a forked end engaging lever 67. A center horizontal arm of lever 69 carries a pass-by pawl 70 normally urged clockwise by spring 71 and positioned to engage shaft 11, which, upon forward rocking movement caused by depression of the keys, passes over pass-by pawl 70 rocking the latter about its pivot. Upon the return movement of the shaft 11, however, it engages pawl 70 which cannot rotate clockwise and therefore moves the horizontal arm of lever 69 downwardly, thus moving its vertical arm 68 rearwardly and thereby rocking lever 67 counterclockwise, which in turn rotates vertical locking shaft 63 to release strike 65 and permit the cash drawer to be opened by its spring 62. The cash drawer is therefore opened at each depression and return of a key. The cash drawer and associated mechanism is described only in sufficient detail for a full understanding of this invention, being the subject-matter of copending applications, Serial Nos. 689,663, 689,664, both filed September 15, 1933, to which reference is made for full disclosures thereof.

Cash register casing

The casing is preferably made in a number of panels and sections and mounted in such a way that each part may be independently removed to permit access to a given section of the machine without disturbing the remaining panels of the casing. The casing panels are preferably detachably secured for the most part to the side plates of the cash register mechanism.

Cash drawer housing

The entire machine is mounted upon the cash drawer housing which will be described first. This housing comprises a lower plate 73 having upturned edges, a top plate 74 having downturned edges and a U-shaped wall member 76 which provides the rear, the two side walls and part of the front of the cash drawer housing. The top and bottom plates are preferably welded to the U-shaped side wall member, thus providing a complete enclosing for the cash drawer which can be inserted and withdrawn through the one remaining open wall. The upper and lower plates are provided with central apertures to give access to the interior of the housing to aid in welding the plates together. The openings may be closed by wooden or other fibrous plates 77 and 78 held in place by screws and which not only deaden the sound of the machine operations and cash drawer movements but add rigidity to the housing and completely close the housing, making it dust proof. The upper plate 74 is provided with slotted lugs 79 to which the side plates 1 and 2 of the cash register machine are attached.

The foregoing construction provides for a rigid drawer housing, eliminates "splits" so prevalent in drawing completely shaped housings from one sheet, and makes it possible to store relatively flat parts.

Cash register housing

Figure 7:
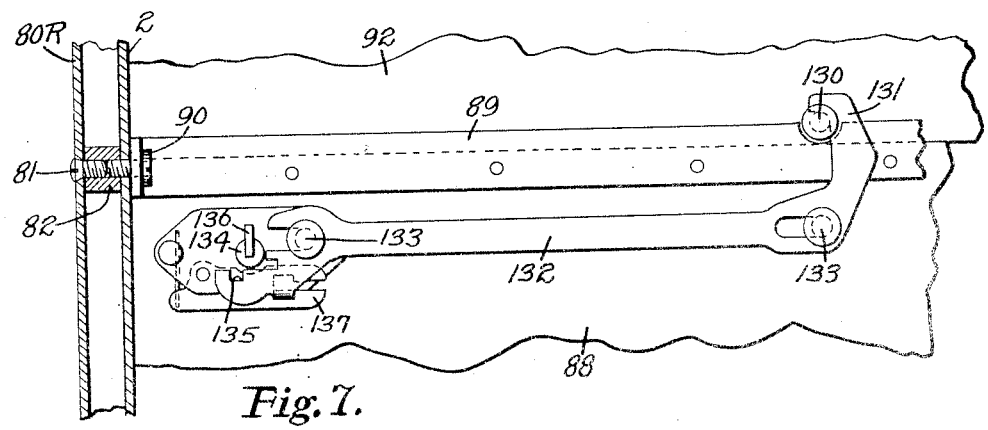
Fig. 7 is an inside elevation looking forward at the lid locking mechanism.
Figure 8:
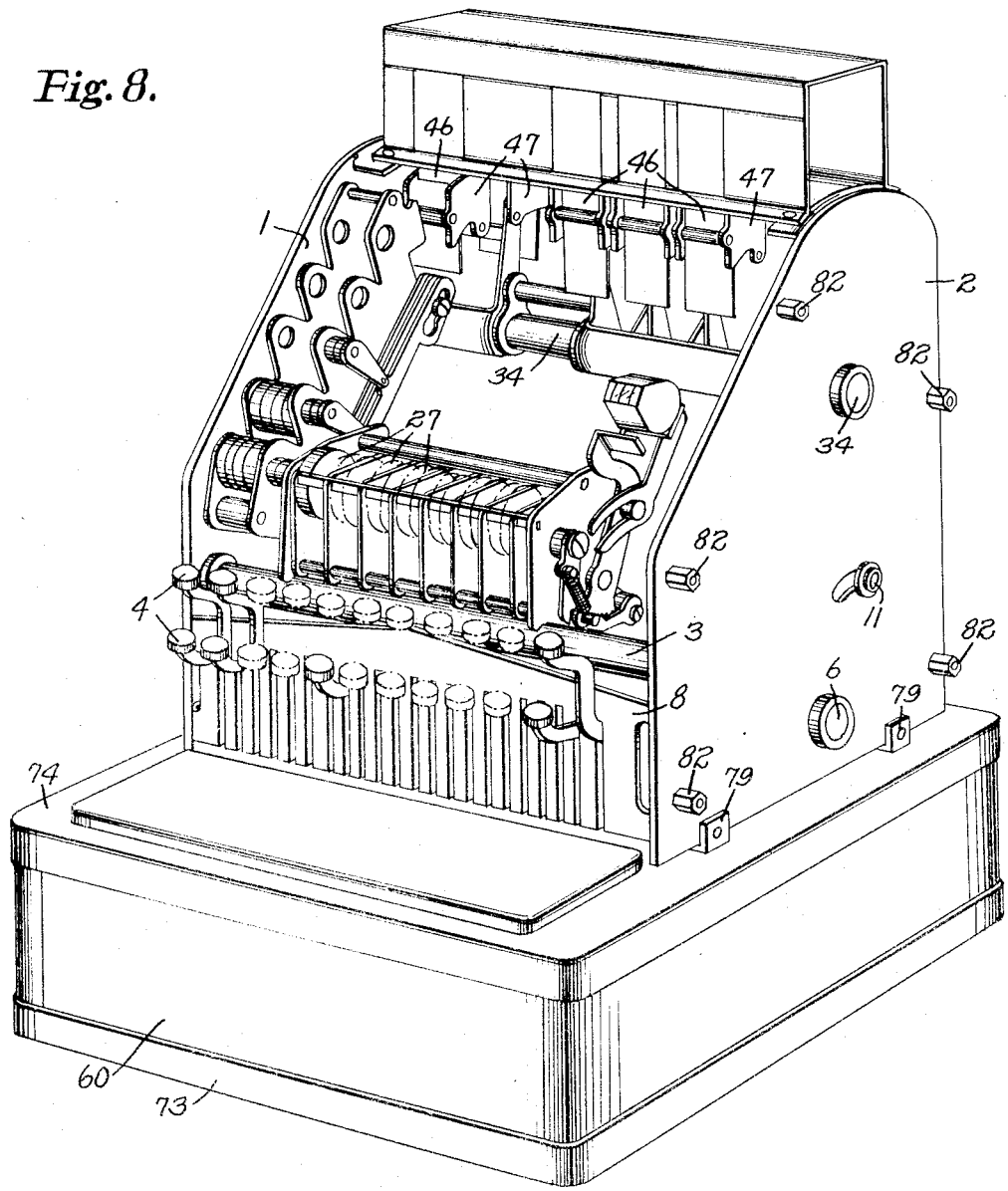
Fig. 8 is a perspective of a machine with parts of the casing and machine omitted to show the assembly.

The casing or housing for the cash register mechanism proper comprises side panels, front and rear panels and a top indicator housing when an indicator is employed. The two side panels 80L and 80R are similar with the exception that one is for the left side and the other is for the right side and are preferably stamped out to provide integral marginal flanges and may also be embossed to provide a depressed center sub-panel effect. The side panels are secured to the side plates 1 and 2 at spaced points around their margins by screws 81 (Figs. 1, 6 and 7) and are held in spaced relation to the side plates by means of ferrules or sleeves 82 spaced between the casing panels and the machine side plates. The space thus provided is used for certain mechanisms which will be later described.

A rear panel 83 extends upwardly from the drawer housing and is provided with a cross bar 84 having forwardly extending hooks or lugs 86 which hook over studs 87 (Fig. 3) extending inwardly from side plates 1 and 2. The rear panel extends upwardly to a point adjacent the top of the casing where it is screwed to the arcuate strip 85 which is fastened by screws to the side plates of the machine (Fig. 3).

A lower front panel 88 rests upon the drawer housing and has slots extending to the bottom edge thereof to permit passage and movement of the keys. The upper edge of panel 88 is secured in place by means of a cross bar 89 terminating in hooked ends interlocking with the screw studs 90 which pass through the side plates 1 and 2 into sleeves 82. The lower edge of front panel 88 is retained in place by means of annularly grooved studs 91 welded near both ends of the panel and disposed about midway of the height of the front panel and positioned to engage cross bar 8 (Fig. 3).

An upper front panel or section 92 constituting a hinged cover is hinged to the side plates of the machine by means of brackets 93 pivotally attached to the side plates 1 and 2, the upper edge of the panel being spaced from the upper edge of the rear panel to accommodate the indicating tab mechanism. Panel 92 is preferably formed with a plane surface to serve as a writing back and is further provided with studs 94 extending through a paper clamping plate 95 for attaching a memorandum pad thereto. A cross piece 96 having lip 97 is secured to the arcuate strips 85 and extends across the top edge of the hinged panel 92 to make a tight joint between the cross piece 96 and the upper edge of the hinged panel 92.

Underlying the hinged panel 92 is an apertured cover plate 98 which conceals the interior mechanism for the cash register but permits observation of the register dials and manipulation of certain controls through the apertures formed therein. The apertures are normally closed by a slide 99 controlled by a lock 100 so arranged that the key can be withdrawn only when the slide is locked closed. The key will, of course, prevent closing of lid 92 for reasons hereafter explained. This plate is also flat and lies parallel to the cover and in close proximity thereto. The plate is supported in place by shouldered screws that project inwardly through the side plates 1 and 2.

The foregoing paneled casing construction eliminates rejection of an entire casing since it is only necessary to reject and replace a single panel, or refurnishing of a single panel. The construction also facilitates storing of the parts since relatively flat panels only need be stored. Furthermore, the side panels may be used for various width machines and, accordingly, the construction is admirably suited to the production of machines of different widths.

Indicator mechanism housing

Figure 2:
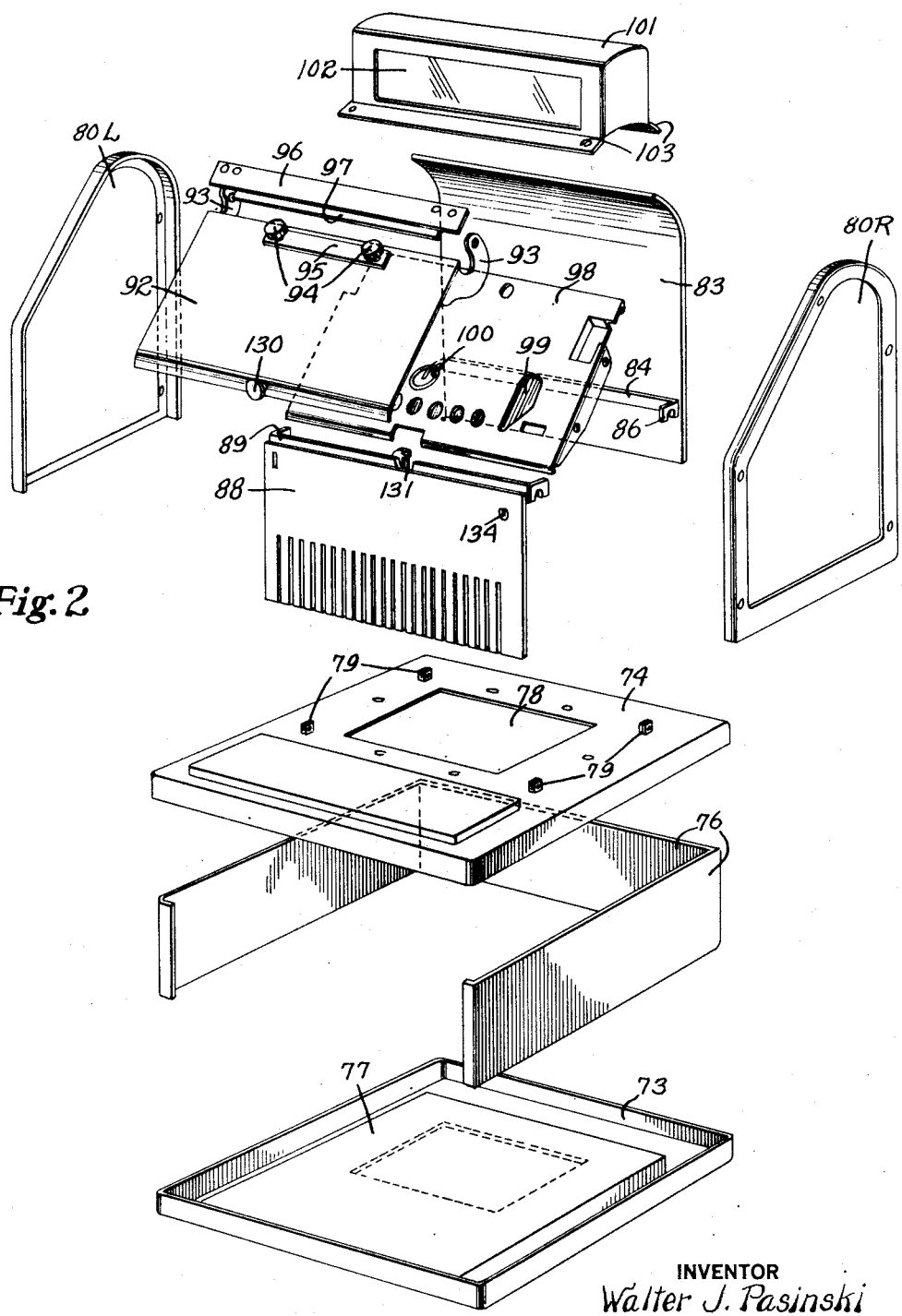
Fig. 2 is a disjointed perspective of the casing panels showing the complete enclosure for the cash register, including the cash drawer.

For those cash registers which are provided with a detachable visible indicating or tab mechanism at the top of the machine, there is provided a detachable indicator casing or housing 101 having front and rear windows 102. The front and rear walls of the housing are flanged outwardly as at 103 which flanges are fastened by screws that extend through the upper edge of the rear panel 83 and through the cross member 96 (Figs. 1, 2, and 3) and are threaded into the arcuate strips 85.

If the machine is not provided with an indicating or tab mechanism, the top cover or indicator housing may be omitted. In such instance as shown in Figs. 4 and 6, the opening between the upper edge of rear panel 83 and cross bar 96 may be closed by a separate plate 104 or the rear panel may be continued around to the cross plate 96.

From the foregoing it will be apparent that any section of the casing may be removed independently of the other sections and without disturbing the other sections to give access to any particular part of the machine which it is desired to inspect or repair. Furthermore, the detachable upper housing for the indicator mechanism and the detachable indicator mechanism provide a structure which is admirably adapted to machines either with or without an indicator mechanism with a minimum change being necessary to the entire mechanism and casing.

Hinged cover control of cash drawer

Whenever the store manager or other authorized person opens the hinged cover 92 to read the register wheels or various counters that may be visible thereby, he usually desires to count the cash in the cash drawer. Therefore, the cash drawer is put under the control of the hinged cover so as to open automatically when the hinged cover is raised.

For this purpose a vertical link 106 lying adjacent the inside of right side plate 2 is connected at its lower end to the forward extremity of the horizontal arm of the T-shaped lever 69 (Fig. 4). Link 106 extends upwardly to a position to be engaged by a stud 107 carried by the right bracket 93 which hingedly connects hinge cover 92 to the right side plate. Lever 106 is secured to the inner side of the right side plate of the cash register mechanism for sliding movements by means of a pin 108 projecting inwardly from the side plate and extending through a triangular shaped opening 109 in the lever. The vertical edge of this opening is normally yieldingly maintained in contact with pin 108 by means of spring 111.

When bracket 93 is rotated clockwise as occurs when the lid is opened, stud 107 will engage the top of the lever or link 106 and depress the latter thus rotating the three-arm lever 69 counterclockwise, releasing the drawer latch. The horizontal portion of the triangular shaped opening in link 106 permits lateral movement of the link when the hinged cover is closed, that is, stud 107 will then move the link to the right as viewed in Fig. 4 without depressing the same, consequently levers 69 and 67 are not rocked when the lid is closed.

The control of the cash drawer in this manner from the hinged cover eliminates the necessity of another and independent operation for opening the cash drawer after the lid is opened and the register totals and counters are being read by the manager.

Hinged cover control of key lock

It is also desirable to have the cash register keys locked against depression when the hinged cover is open, therefore provision is made to lock the keys against depression upon opening the hinged cover.

Accordingly the lower edge of the left cover bracket 93 is formed as a cam edge 115 (Fig. 3) which cam edge engages a stud 116 carried upon one arm of a crank lever 117 pivoted to the outer surface of the left plate 1 and lying between the casing panel and the plate, space being provided therebetween as previously described. Stud 116 projects through the casing through an arcuate slot formed in the plate to engage the cam. Crank lever 117 is urged counterclockwise by spring 118 but is normally held against movement by means of a stud 119 carried upon the end of the lower arm of the crank lever 117, which stud seats in a pocket formed in the upper end of one arm 121 of a bell crank lever pivoted at 122 and having a rearward arm 123 which terminates in an abutment 124 at its upper end in position to engage a stud 126 projecting laterally from the arm 57 of the key locking bail 50. Stud 126 projects through a slot in the left frame 1 to be in position to be engaged by lever 121—123 which is pivoted to the outer side of the end plate 1.

From the foregoing it will be apparent that when hinged cover 92 is raised only a slight distance, stud 116 will clear the high point of this cam 115 and permit counterclockwise movement of the crank 117. Movement of crank 117 will move stud 119 from the pocket in the upper end of lever 121 and in so doing will rock bell crank lever 121—123. Upon further movement stud 119 will engage the curved finger 127 (Fig. 3) formed on the upper end of arm 121 and travel up the arcuate forward edge of the finger 127 and produce no further movement of the latter lever. This slight movement, however, of lever 121—123 moves arm 123 which engages stud 126 and therefore rocks locking bail 50 into position to engage pins 53 upon the key levers, thereby blocking the levers against further depression. This condition of the mechanism is shown in Fig. 4. From the foregoing, it will be seen that raising cover 92 not only automatically opens the cash drawer but prevents depression of any keys. As previously stated, the presence of a key in lock 100 of plate 98 prevents full closing of lid 92, therefore the machine cannot be operated unless slide 99 is closed and locked and unless cover 92 is closed.

Hinged cover lock

To prevent unauthorized persons from opening the hinged cover 92 a lock therefor is provided. For this purpose, the lower forward edge of the cover is provided with a knob 130 whose stem projects inside of the casing where it cooperates with a locking hook 131 (Figs. 6 and 7) formed upon one end of a lever 132 slidably supported upon the inner upper portion of the lower front panel 88 by means of pins 133. Link 132 extends to the right side of the machine where it cooperates with a cylinder lock 134, said lever 132 being provided with a notch 135 upon its extreme end by means of which the key 136 slides the lever to the right or left. The lock is controlled by tumblers 137. Any suitable lock may be provided for controlling movement of lever 132, therefore the illustrated lock is not described in any detail.

It will be apparent to those skilled in the art that changes may be made in details of construction of the illustrated embodiment of this invention without departing from the spirit and scope of the invention as defined in the appended claims.

I claim:

1. A cash register comprising an exterior casing having a hinged panel, a bracket for hingedly supporting said panel, cash register mechanism disposed within said casing and including depressible keys, means controlled by said bracket for preventing depression of said keys when said hinged panel is in open position, a cash drawer disposed below said mechanism, means for normally opening said drawer, a latch for securing said drawer in closed position and releasable by operation of said keys, and means controlled by said bracket for releasing said latch when said hinged panel is in open position.

2. A cash register comprising an exterior casing having a hinged panel, cash register mechanism disposed within said casing and including depressible keys, means for preventing the depression of said keys when said hinged panel is in open position, a cash drawer disposed below said cash register mechanism, means for normally opening said drawer, a latch for securing said drawer in closed position and releasable by operation of said keys, and means for releasing said latch when said hinged panel is in open position.

WALTER J. PASINSKI.